(12) United States Patent
Jiang

(10) Patent No.: US 10,174,911 B2
(45) Date of Patent: Jan. 8, 2019

(54) FILTER, CMY COLOR MIXING ASSEMBLY USING THE FILTER AND OPTICAL SYSTEM THEREOF

(71) Applicants: Guangzhou Haoyang Electronic Co., Ltd., Guangzhou (CN); Weikai Jiang, Guangzhou (CN)

(72) Inventor: Weikai Jiang, Guangzhou (CN)

(73) Assignees: Guangzhou Haoyang Electronic Co., Ltd. (CN); Weikai Jiang (CN)

( * ) Notice: Subject to any disclaimer, the term of this patent is extended or adjusted under 35 U.S.C. 154(b) by 277 days.

(21) Appl. No.: 15/303,476

(22) PCT Filed: Apr. 28, 2015

(86) PCT No.: PCT/CN2015/077640
§ 371 (c)(1),
(2) Date: Oct. 11, 2016

(87) PCT Pub. No.: WO2015/176594
PCT Pub. Date: Nov. 26, 2015

(65) Prior Publication Data
US 2017/0030554 A1    Feb. 2, 2017

(30) Foreign Application Priority Data

May 23, 2014    (CN) .......................... 2014 1 0223005

(51) Int. Cl.
*G02B 27/10*    (2006.01)
*F21V 9/40*    (2018.01)
(Continued)

(52) U.S. Cl.
CPC .............. *F21V 9/40* (2018.02); *F21S 10/007* (2013.01); *F21V 5/007* (2013.01); *F21V 5/008* (2013.01);
(Continued)

(58) Field of Classification Search
CPC . F21V 9/40; F21V 5/007; F21V 5/004; F21V 5/008; F21V 29/503;
(Continued)

(56) References Cited

U.S. PATENT DOCUMENTS 5,969,868 A    10/1999    Bomhorst et al.
7,027,238 B2 *  4/2006    Weiss ..................... G02B 21/06
                                                             359/385
(Continued)

FOREIGN PATENT DOCUMENTS

| CN | 101622586 A | 1/2010 |
|---|---|---|
| CN | 104048266 A | 9/2014 |
| CN | 204201778 U | 3/2015 |

OTHER PUBLICATIONS

International Search Report for Application No. PCT/CN2015/077640 dated Jun. 29, 2015.

*Primary Examiner* — William R Alexander
(74) *Attorney, Agent, or Firm* — Lerner, David, Littenberg, Krumholz & Mentlik, LLP

(57) ABSTRACT

The present invention relates to a filter, a CMY color mixing assembly using the filter and an optical system thereof. Said filter comprises a substrate and a filtering film plated on the substrate, and the filtering film comprises a uniform region and a color mixing region. The thickness of the filtering film in the uniform region is uniform, while the thickness of the filtering film in the color mixing region is not uniform. The thickness of the filtering film in the uniform region is greater than or equal to the thickness of the filtering film in the color mixing region, and the thickness of the filtering film of a central region of the color mixing region is greater than the thickness of the filtering film of side regions of the color mixing region. Said color mixing region is provided at a side where the filter first accesses to a light path.

8 Claims, 3 Drawing Sheets

(51) Int. Cl.
*F21S 10/00* (2006.01)
*F21V 29/503* (2015.01)
*F21Y 105/10* (2016.01)
*F21Y 115/10* (2016.01)
*F21V 5/00* (2018.01)
*F21W 131/406* (2006.01)

(52) U.S. Cl.
CPC ......... *G02B 27/10* (2013.01); *G02B 27/1006* (2013.01); *F21V 5/004* (2013.01); *F21V 29/503* (2015.01); *F21W 2131/406* (2013.01); *F21Y 2105/10* (2016.08); *F21Y 2115/10* (2016.08); *G02B 27/106* (2013.01)

(58) Field of Classification Search
CPC .. G02B 27/1006; G02B 27/106; G02B 27/10; F21Y 2105/10; F21Y 2115/10; F21W 2131/406
USPC ........................................................ 359/891
See application file for complete search history.

(56) References Cited

U.S. PATENT DOCUMENTS

| | | | |
|---|---|---|---|
| 9,164,274 B2 * | 10/2015 | Lin | G02B 26/008 |
| 9,297,516 B2 * | 3/2016 | Hartwig | G03B 21/204 |
| 9,458,988 B2 * | 10/2016 | Caruso | F21V 9/10 |
| 9,863,608 B2 * | 1/2018 | Wu | G03B 21/204 |
| 9,915,860 B2 * | 3/2018 | Akiyama | G02B 26/008 |
| 2003/0072161 A1 | 4/2003 | Hough et al. | |
| 2008/0291561 A1 | 11/2008 | Bomhorst | |
| 2011/0116253 A1 * | 5/2011 | Sugiyama | F21S 10/007 362/84 |

* cited by examiner

FILTER, CMY COLOR MIXING ASSEMBLY USING THE FILTER AND OPTICAL SYSTEM THEREOF

CROSS REFERENCE TO RELATED APPLICATIONS

The present application is a national phase entry under 35 U.S.C. § 371 of International Application No. PCT/CN2015/077640, filed Apr. 28, 2015, which claims priority from Chinese Patent Application No. 201410223005.0 filed May 23, 2014, all of which are hereby incorporated herein by reference.

TECHNICAL FIELD

The present invention relates to the technical field of stage lighting, and in particular, relates to a filter, a CMY color mixing assembly using the filter and an optical system thereof.

BACKGROUND

In the field of stage lighting, in general, it requires to apply stage lighting device (such as lighting lamp and etc) and technical means, to display the environment, render the atmosphere, highlight a central person, create spatial impression and sense of time of the stage, mold the external image of the stage through light color and its changes, and provide necessary lighting effects. Generally, wash light is used to achieve molding of color rendering effects.

At present, wash light generally uses RGB theory to perform color mixing, or uses CMY color mixing system to process mixing. However, with respect to CMY color mixing, the color conversion of the present wash light performing CMY color mixing could not produce an effect of uniformly gradual changes. When converting from one color to another, the transition of the color is a sudden change, and the color of the pattern is not uniform enough.

SUMMARY OF THE PRESENT INVENTION

The technical problem to be solved in the present invention is to provide a filter with more uniform color conversion, a CMY color mixing using the filter and an optical system thereof.

In order to solve the above-described technical problem, the technical solution employed in the present invention is that: a filter, comprises a substrate and a filtering film plated on the substrate, wherein the filtering film comprises a uniform region and a color mixing region. The thickness of the filtering film in the uniform region is uniform, while the thickness of the filtering film in the color mixing region is not uniform. The thickness of the filtering film in the uniform region is greater than or equals to the thickness of the filtering film in the color mixing region, and the thickness of the filtering film of a central region of the color mixing region is greater than the thickness of the filtering film of side regions of the color mixing region. Said color mixing region is provided at a side where the filter first accesses to a light path.

In this solution, the filtering film is designed as the uniform region and the color mixing region. A light beam first enters into the color mixing region. Since the thickness of the filtering film of the color mixing region is partially or entirely less than that of the uniform region, the conversion of the light beam can be smoother when its color is changing. When the light beam emitted from the color mixing region is mixed with other lights, it mitigates the gradient of the color change. From the perspective of a human eye, its color conversion presents a uniform change. As the light beams entering into the filter increase gradually, the color also changes gradually, until spanning from the color mixing region to the uniform region. At this time, the color has darkened gradually and the color mixing is finally completed.

As a first improved solution of the present invention, the filtering film in said color mixing region presents as a semi-circular comb-like pattern, with its middle region A having a greater thickness and side regions B having a smaller thickness.

As a second improved solution of the present invention, said color mixing region is provided with a first pattern region C, a second pattern region D, a third pattern region E and a middle pattern region F in sequence along a direction of accessing to the light path. The middle pattern region F is arranged at the middle of the color mixing region. The first pattern region C employs an arc-shaped comb-like pattern, and the third pattern region E employs an arc-shaped fogged film. The second pattern region D is arranged between the first pattern region C and the third pattern region E. Wherein, the coating film thickness of the first pattern region C is greater than the coating film thickness of the second pattern region D, and the middle pattern region F is constituted by a first portion of the filtering film with the same thickness as that of the uniform region and a comb-like pattern arranged close to a side of the light path.

The present invention further provides a CMY color mixing assembly, comprising a cyan filter, a magenta filter and a yellow filter. Each "filter" herein below refers to the above-described filter.

In this solution, each filter is designed to comprise the color mixing region and the uniform region, so that when color mixing is performed with single filter or two filters or three filters, the color conversion becomes more uniform.

In addition, the present invention further provides an optical system with said CMY color mixing assembly, comprising a light source device, said CMY color mixing assembly and an effecting assembly which are arranged in sequence along the light path. Each filter in said CMY color mixing assembly is arranged separately in a hierarchy from top to bottom in sequence. The CMY color mixing assembly further comprises color mixing driving mechanisms corresponding to each filter, with each filter connecting to the corresponding color mixing driving mechanisms respectively. The light source device emits light, and the CMY color mixing assembly controls corresponding filter to access the light path according to the requirements of the color of the emitted light. After the corresponding color is formed, the light beam enters into the effecting assembly and then is emitted.

Said light source device is a LED light source module. Said LED light source module comprises a LED array, a lens array, an optical integral element and a focusing lens which are arranged in sequence along the light path. Wherein, the LED array is packaged on a heat dissipation substrate, and each lens on the lens array is arranged in one-to-one correspondence with each LED on the LED array, respectively. Said lens array is used for concentrating and combining the light emitted from each LED on the LED array into a combined light beam, and the optical integral element performs preliminary uniform treatment to the light beam. Said optical integral element is a micro lens array, and said LED array is a white LED array.

Compared with the prior arts, the beneficial effects of the present invention are as follows:

In the present invention, through designing the filter to comprise the color mixing region and the uniform region, the color conversion becomes more uniform when the filter performs color mixing. Moreover, the present invention employs a structure combining the CMY color mixing assembly and the LED light source device, which could greatly improve the efficiency and brightness of the color relative to traditional structures.

DETAILED DESCRIPTION OF THE PREFERRED EMBODIMENT

The present invention is further described in combination with the specific embodiments.

Figure 1:
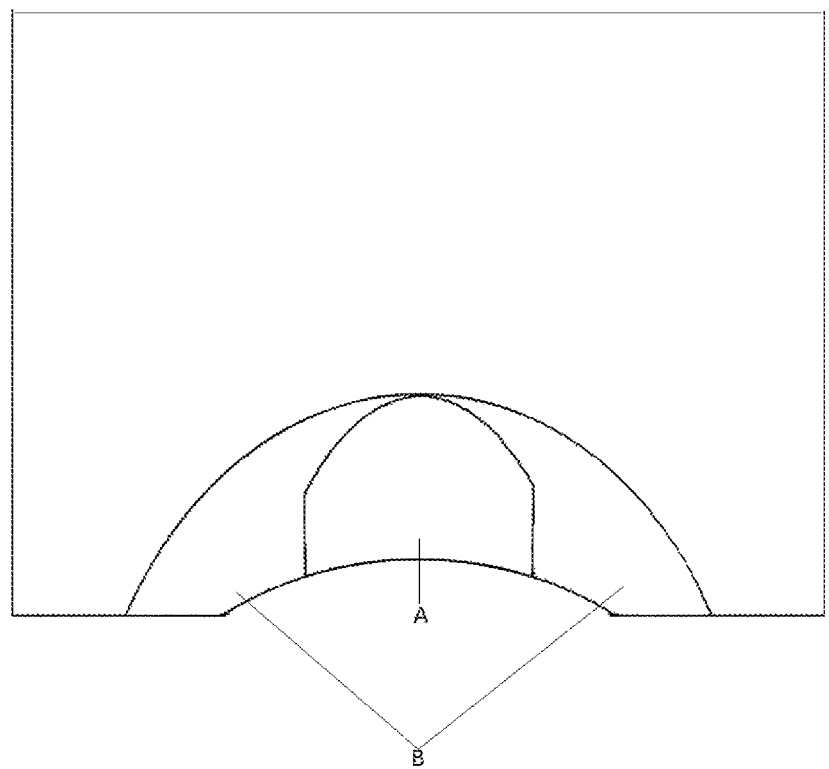
FIG. 1 is a schematic view of the first structure of filter the according to the present invention.
Figure 2:
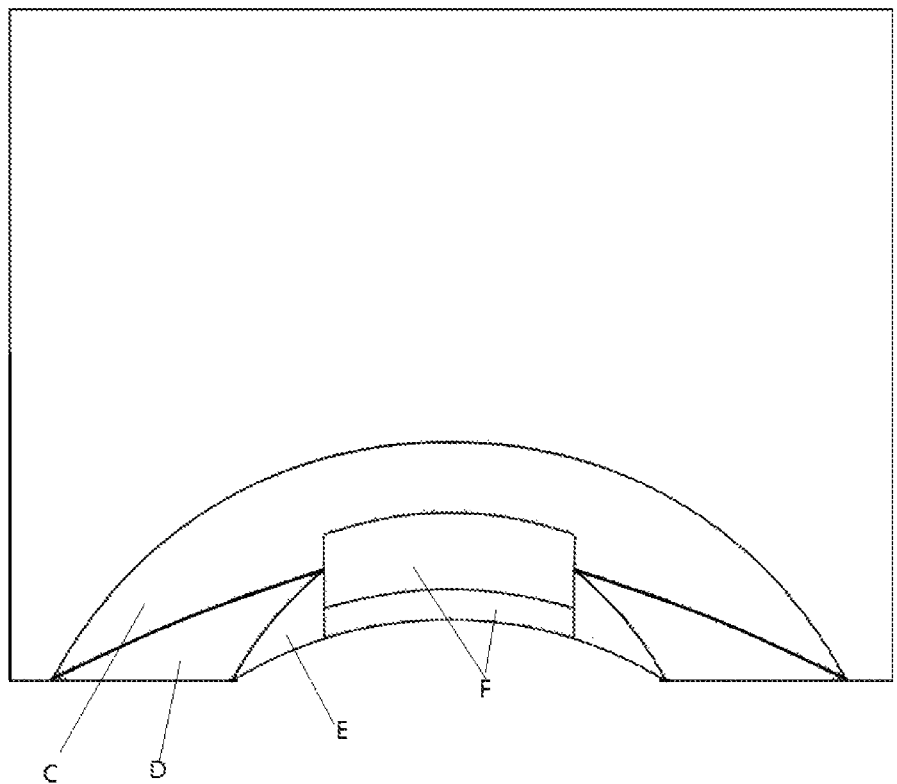
FIG. 2 is a schematic view of the second structure of the filter according to the present invention.

As shown in FIG. 1 and FIG. 2, a filter comprising a substrate and a filtering film plated on the substrate is provided, wherein the filtering film comprises a uniform region and a color mixing region. The thickness of the filtering film in the uniform region is uniform, while the thickness of the filtering film in the color mixing region is not uniform. The thickness of the filtering film in the uniform region is greater than or equal to the thickness of the filtering film in the color mixing region, and the thickness of the filtering film of a central region of the color mixing region is greater than the thickness of the filtering film of side regions of the color mixing region. Said color mixing region is provided at a side where the filter first accesses to a light path.

Wherein, the coating film thickness of the filtering film in the uniform region is uniform, so that after the light beam passing through this region is emitted, it presents color with same color depth. The coating film thickness of the filtering film in said color mixing region is not uniform, to form different designs (patterns), so that after the light beam passing through this region is emitted, it presents color with different degree of color depth. Since the thickness of the filtering film of the color mixing region is partially or entirely less than that of the uniform region, the conversion of the light beam could be smoother when changing its color. When the light beam emitted from the color mixing region is mixed with other lights, it mitigates the gradient of the color change. From the perspective of a human eye, its color conversion presents a uniform change.

As shown in FIG. 1, it is a schematic view of the first structure of filter the according to the present invention, the filtering film in said color mixing region presents as a semi-circular comb-like pattern, with its middle region A having a greater thickness and side regions B having a smaller thickness.

As shown in FIG. 2, it is a schematic view of the second structure of the filter according to the present invention. Said color mixing region is provided with a first pattern region C, a second pattern region D, a third pattern region E and a middle pattern region F in sequence along a direction of accessing to the light path. The middle pattern region F is provided at the middle of the color mixing region. The first pattern region C employs an arc-shaped comb-like pattern, and the third pattern region E employs an arc-shaped fogged film. The second pattern region D is arranged between the first pattern region C and the third pattern region E. Wherein, the coating film thickness of the first pattern region C is greater than the coating film thickness of the second pattern region D, and the middle pattern region F is constituted by a first portion of the filtering film with the same thickness as that of the uniform region and a comb-like pattern arranged close to a side of the light path.

The specific processing method for each filter is as follows: first, plating filtering layers with certain thicknesses on the filter according to different wave bands, then drawing a pattern shape as required within a certain region according to the requirements, and then processing doting along the outline of the pattern shape by laser, so as to carve the thickness of the layer of each point on different outline to different thickness by laser according to the requirements, to form a color mixing region with non-uniform coating film thickness, so that the color mixing region with a gradual change in color is formed. The layer outside the color mixing region retains original thickness, and serves as the uniform region.

The present invention further provides a CMY color mixing assembly, comprising a cyan filter, a magenta filter and a yellow filter. Each "filter" herein below refers to the above-described filter.

Figure 3:
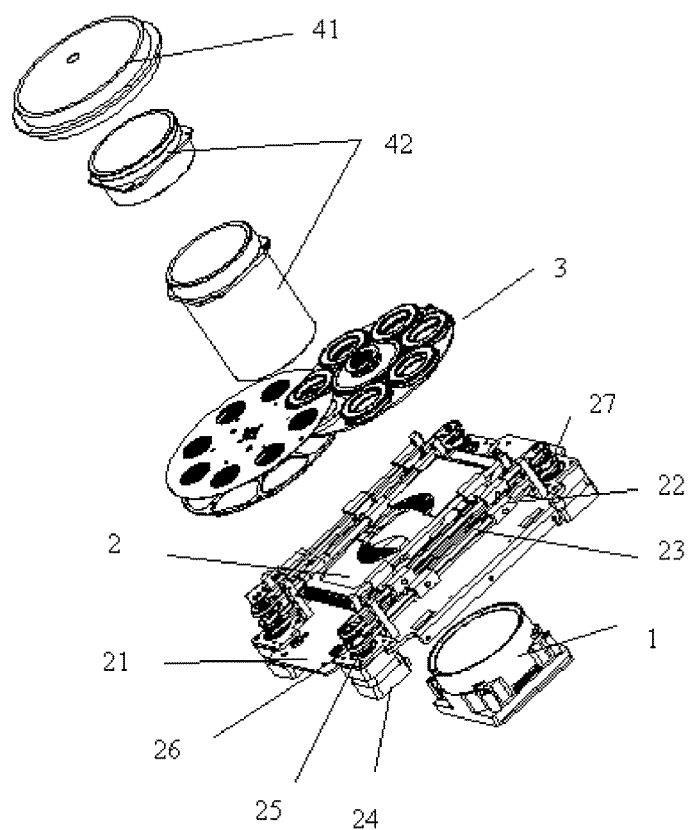
FIG. 3 is a schematic view of the structure of the optical system according to the present invention.

In addition, as shown in FIG. 3, the present invention further provides an optical system with said CMY color mixing assembly, comprising a light source device 1, said CMY color mixing assembly 2 and an effecting assembly 3 which are arranged in sequence along the light path. Each filter in said CMY color mixing assembly 2 is arranged separately in a hierarchy from top to bottom in sequence. The CMY color mixing assembly 2 further comprises color mixing driving mechanisms corresponding to each filter, with each filter connecting to the corresponding color mixing driving mechanism respectively. The light source device 1 emits light, and the CMY color mixing assembly 2 controls corresponding filter to access the light path according to the requirements of the color of the emitted light. After the corresponding color is formed, the light beam enters into the effecting assembly 3 and then is emitted.

The CMY color mixing assembly 2 further comprises a fixing frame 21, with each filter connecting to the corresponding color mixing driving mechanism respectively, and the color mixing driving mechanisms connecting onto the fixing frame 21. Each color mixing driving mechanism comprises a driving transmission mechanism, a sliding block 22 and a guide rod 23 which are corresponding to one filter. Said driving transmission mechanism is connected with the sliding block 22, the sliding block 22 is slidably sheathed on the guide rod 23, and each said filter is connected with corresponding sliding block 22 respectively.

As a first preferred solution, as shown in FIG. 3, said driving transmission mechanism comprises a driving motor 24, a driving wheel 25, a transmission belt 26 and a driven wheel 27. The driving wheel 25 is in connection with an output shaft of the driving motor 24, the driven wheel 27 is connected with a fixing assembly, and in particular, the driven wheel 27 may be in connection with an output shaft of another driving motor by a bearing. An end of the transmission belt 26 is connected with an end of the sliding block 22, the other end of which bypasses the outside of the driving wheel 25 and the outside of the driven wheel 27 respectively, extends to the other end of the sliding block 22, and thereby is connected with the other end of the sliding block 22.

As a second preferred solution, said driving transmission mechanism is a linear actuator. The linear actuator is connected with the sliding block. By means of a linear motion of the linear actuator, it may drive the filter moving in or out of the light path, so as to realize its color mixing function.

Figure 4:
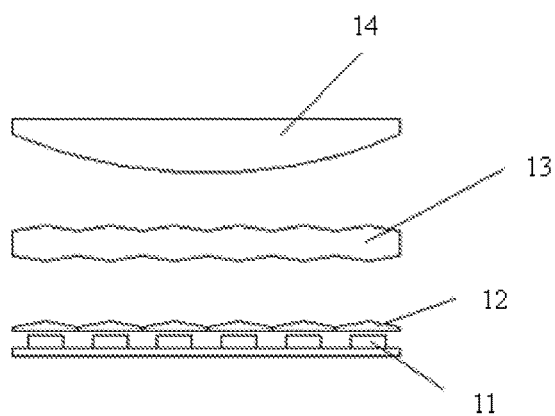
FIG. 4 is a schematic view of the structure of the light source device according to the present invention.

Furthermore, as shown in FIG. 4, said light source device is a LED light source module. Said LED light source module comprises a LED array 11, a lens array 12, an optical integral element 13 and a focusing lens 14 which are arranged in sequence along the light path. Wherein, the LED array is packaged on a heat dissipation substrate, and each lens on the lens array is arranged in one-to-one correspondence with each LED on the LED array, respectively. Said lens array is used for concentrating and combining the light emitted from each LED on the LED array into a combined light beam, and the optical integral element performs a preliminary uniform treatment to the light beam. Said optical integral element is a micro lens array and said LED array is a white LED array.

The definition of the locations of the uniform region with uniform coating film thickness and the color mixing region with non-uniform coating film thickness is determined according to a plurality of factors such as the size of an light exit port of the light source, the light exit angle of the light source, the size of the filter, the requirements of the gradual changing process of color mixing, the interference of the mechanical structure, and etc.

The size of the light exit port of an incident light source determines the locations of the filters when fully open, and the filters are required to be in an unsheltered state; while there cannot be a light emitted from the light source entering into the subsequent optical assembly directly without passing through the filters when the filters are fully closed, and when the filters are fully closed, the middle portions of two of the filters needs to be reserved uniform regions, and the non-uniform regions of the two of the filters don't overlap, so as to achieve a panchromatic effect. Bigger size of the light exit port requires bigger size of the filter when the panchromatic effect is achieved eventually, and the wider the gradual changing process of color mixing is, the bigger the size of the filter is. In the meantime, the limitation to the dimension of the whole optical system usually limits the size of the filter, and will cause failing to achieve big gradual changing process infinitely.

For the color mixing region, its layout design (pattern design) of the coating film thickness may be designed according to the actual requirements, which include: types of the light sources selected according to lamps, the distribution of the light after the light source, properties of the wave band of the filter, and the distance between the filter and the light source. The uniformity of the color mixing of the filter certainly has a close relationship with the location of white light holes (GOBO) in the effecting assembly. The location of white light holes (GOBO) in the effecting assembly should be selected at which the light energy is most concentrated and the uniformity of the distribution of the light is best. The types of the light sources are different, while the distribution of the light sources is different, and the required design of the collecting light path of which is different, causing a big difference in the distribution of the light after the light passing through a collecting lens. In the meantime, the design of the collecting light path doesn't need to consider aberrations. After the light passing through the lens, the uniformity of the distribution of the light of different locations along an optical axis is different, and the uniformity of the distribution of the light of same point of the optical axis is different with that of different points on the flat spots perpendicular to the optical axis. The filters may be selected within a visible wave band, but color subtraction principle is employed, i.e., the common white light may be considered as formed by mixing red, green and blue three colors. Color subtraction is that plating design is employed at each standard, so that RGB reflects one of these colors back, while the other two colors transmit, so in general, the colors transmitting the employed filters by the light source are: magenta, cyan and yellow, respectively. Thus, the configuration of three layers of filters is determined according to the levels of sensitivity of a human eye to the above three colors. Generally, the color that the human eye is most sensitive is closer to the location of the light source, and so forth. In the meantime, although it can be deduced from the above that magenta is obtained by adding blue and red together. But if the locations of the wave bands of red and blue are selected to be different, after transmits through the magenta filter, the color of which is slightly different, which will affect the pattern design on the filter. In general, since there are aberrations when designing the collecting lens or reflector, the convergence points of which will be a range rather than at certain location. In this range, there is a point that the light energy is most concentrated, but the uniformity may be relatively poor. There is certainly a location where the light spot is most uniform, and the light energy may be slightly low. The uniformity at the location of the white light holes (GOBO) of the effecting assembly in filter color mixing will affect the uniform effect of the light spot out from the whole lamp.

Said effecting assembly comprises one or more of a pattern plate assembly, a color plate, a prism assembly and etc.

The optical system of the present invention further comprises an optical assembly, and said optical assembly comprises a focusing assembly 41, lenses 42 and etc which are arranged in sequence along the light path.

Apparently, the above-described embodiments of the present invention are just embodiments for describing the present invention clearly, but not limitation to the implementations of the present invention. For those having ordinary skill in the art, variations or changes in different forms can be made on the basis of the above description. All of the implementations should not and could not be exhaustive herein. Any amendments, equivalent replacements and improvement made within the spirit and principle of the present invention shall all be included within the scope of protection of the claims of the present invention.

What is claimed:

1. A filter, comprising a substrate and a filtering film plated on the substrate, wherein the filtering film comprises a uniform region and a color mixing region, the thickness of the filtering film in the uniform region is uniform, while the thickness of the filtering film in the color mixing region is not uniform, the thickness of the filtering film in the uniform region is greater than or equal to the thickness of the filtering film in the color mixing region, the thickness of the filtering film of a central region of the color mixing region is greater than the thickness of the filtering film of side regions of the color mixing region, and said color mixing region is provided at a side where the filter first accesses to a light path.

2. The filter according to claim 1, wherein the filtering film in said color mixing region presents a semi-circular comb-like pattern, with its middle region A having a greater thickness and side regions B having a smaller thickness.

3. The filter according to claim 1, wherein said color mixing region is provided with a first pattern region C, a second pattern region D, a third pattern region E and a middle pattern region F in sequence along a direction of accessing to the light path, the middle pattern region F being provided at the middle of the color mixing region, the first pattern region C employing an arc-shaped comb-like pattern, the third pattern region E employing an arc-shaped fogged film, and the second pattern region D being arranged between the first pattern region C and the third pattern region E; wherein, the coating film thickness of the first pattern region C is greater than the coating film thickness of the second pattern region D; and the middle pattern region F is constituted by a first portion of the filtering film with the same thickness as that of the uniform region and a comb-like pattern arranged close to a side of the light path.

4. A CMY color mixing assembly, wherein it comprises a cyan filter, a magenta filter and a yellow filter, and each said filter is the filter of claim 1.

5. An optical system with said CMY color mixing assembly of claim 4, wherein said optical system comprises a light source device, said CMY color mixing assembly and an effecting assembly which are arranged in sequence along the light path, each filter in said CMY color mixing assembly being arranged separately in a hierarchy from top to bottom in sequence, the CMY color mixing assembly further comprising color mixing driving mechanisms corresponding to each filter, with each filter connecting to the corresponding color mixing driving mechanism respectively; the light source device emits light, the CMY color mixing assembly controls corresponding filter to access the light path according to the requirements of the color of the emitted light, and after the corresponding color is formed, the light beam enters into the effecting assembly and then is emitted.

6. The optical system according to claim 5, wherein said light source device is a LED light source module.

7. The optical system according to claim 6, wherein said LED light source module comprises a LED array, a lens array, an optical integral element and a focusing lens which are arranged in sequence along the light path, wherein, the LED array is packaged on a heat dissipation substrate, each lens on the lens array is arranged in one-to-one correspondence with each LED on the LED array, respectively, said lens array is used for concentrating and combining the light emitted from each LED on the LED array into a combined light beam, and the optical integral element performs a preliminary uniform treatment to the light beam.

8. The optical system according to claim 7, wherein said optical integral element is a micro lens array, and said LED array is a white LED array.

* * * * *